United States Patent [19]

Mama

[11] Patent Number: 4,857,883

[45] Date of Patent: Aug. 15, 1989

[54] CALL DEVICE-ATTACHED PATROL RECORDER

[75] Inventor: Shinichi Mama, Yokohama, Japan

[73] Assignee: Amano Corporation, Yokohama, Japan

[21] Appl. No.: 895,484

[22] Filed: Aug. 11, 1986

[30] Foreign Application Priority Data

Aug. 23, 1985 [JP] Japan ................................ 60-185446

[51] Int. Cl.[4] ......................... H04Q 1/30; G08B 25/00

[52] U.S. Cl. ................................. 340/311.1; 340/306; 340/825.15

[58] Field of Search ..................... 340/311.1, 306, 307, 340/286, 309.15, 309.3, 825.15, 825.27, 825.44; 346/33 R, 47, 144

[56] References Cited

U.S. PATENT DOCUMENTS 3,237,183 2/1966 Easan ................................. 340/306
3,959,633 5/1976 Lawrence et al. .................. 340/306
3,990,067 11/1976 Van Dusen et al. ................ 340/306
4,296,408 10/1981 Neurinser ............................ 340/306

FOREIGN PATENT DOCUMENTS 2161967 1/1986 United Kingdom ................ 340/306

*Primary Examiner*—Donnie L. Crosland
*Attorney, Agent, or Firm*—Wenderoth, Lind & Ponack

[57] ABSTRACT

A call device-attached patrol recorder for use with a group of coders includes a patrol storing apparatus which includes a patrol recorder having a circuit for storing patrol information consisting of a position code of a coder arranged at every check position of a patrol course and a patrol time in turn by inserting the patrol recorder into the coder and a central unit having a circuit for reading out and printing out the patrol information recorded in the patrol recorder on paper; the patrol recorder also including a receiver for receiving a call signal emitted from a transmitter and an acknowledging device for acknowledging the receipt of the call signal.

3 Claims, 3 Drawing Sheets

CALL DEVICE-ATTACHED PATROL RECORDER

BACKGROUND OF THE INVENTION

1. Field of the Invention

This invention relates to a patrol recorder suitably used for a crime prevention patrol to various institutes such as factories, warehouses, buildings, schools and the like, and more particularly to a patrol recorder equipped with a device having the function similar to that of a pocket bell pager or beeper.

2. Description of the Prior Art

In general, there are two known methods for making an emergence contact with a patrol guard on his patrol from a center (administration room); one is that the patrol guard is given a transreceiver to carry with him and the other is that the patrol guard is given a pocket bell pager or beeper to carry with him for communicating with the center by using a telephone line.

On the other hand, as a crime prevention patrol recorder (patrol system), an electronically controlled (microcomputer controlled) patrol system which is developed by the present applicant (Japanese patent application Nos. 59(1984)-204639 and 59(1984)-277687) is now undergoing the place of the conventional mechanically operated patrol recorder.

The method to have each patrol guard carry a transreceiver for an emergency use has the advantage that an intimate concact can be made between the center and the patrol guard. However, since in actual situations the crime prevention patrol work is mostly entrusted to a guard company or the like in recent times, the distance between the center and the patrol place is often too far to communicate through a transreceiver. Aside from the distance problem, it is too difficult for a patrol guard to carry both the patrol recorder and the transducer on his patrol which causes an inconvenience to his patrol.

On the other hand, the pocket bell pager or beeper is made comparatively small in bulk and light in weight. In addition, it can be used for a long distance communication. Thus, the center can get in touch with the patrol guard even if he is patrolling a place far away from the center through the pocket bell. This is the reason why pocket bells are largely used at present.

Although it is true that the pocket bell is small in bulk and light in weight, there still remains the problem that it is troublesome for the patrol guard to carry the pocket bell besides the patrol recorder. In addition, the patrol guard often forgets to carry the pocket bell. In such cases, no communication can be made between the center and the patrol guard as a matter of course.

The present invention was accomplished in order to solve the above-mentioned problems.

SUMMARY OF THE PRESENT INVENTION

It is therefore an object of the present invention to provide a call device-attached patrol recorder, wherein an electronic patrol recorder is built in with a receiver similar to a pocket bell pager or beeper, so that when it receives a call signal from a center, a means for acknowledging the receipt of the call signal is actuated to let a patrol guard know that there was a call, i.e., a necessity for him to communicate with the center.

In order to accomplish the above object, a call device-attached patrol recorder according to the present invention is constituted as such that a patrol recording apparatus comprises a patrol recorder including a means for storing patrol information comprising a position code of a coder arranged at every check position of a patrol course and a patrol time in turn by inserting it into the coder and a central unit adapted to read out and print out the patrol information recorded in the patrol recorder on a roll of paper, whereby the patrol recorder includes a means for receiving a call signal emitted from a transmitter and a means for acknowledging the receipt of the call signal.

The above and other objects, features and advantages of the present invention will become apparent to those skilled in the art from the following detailed description of the embodiments of the present invention, when taken in conjunction with the accompanying drawings, wherein;

DETAILED DESCRIPTION OF THE PREFERRED EMBODIMENTS

One preferred embodiment of a call device-attached patrol recorder according to the present invention will be described hereinafter with reference to the accompanying drawings.

Figure 1:
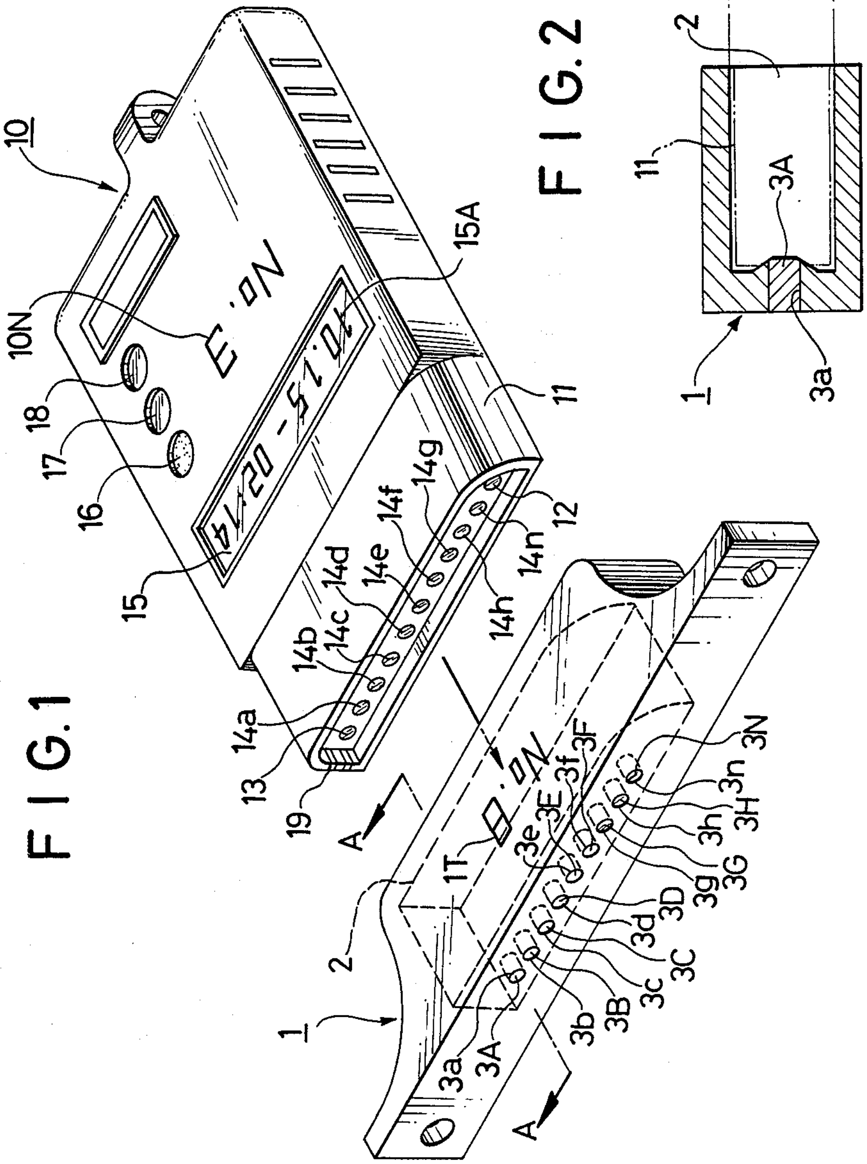
FIG. 1 is a perspective view showing a patrol recorder and a coder according to one embodiment of the present invention.
Figure 2:
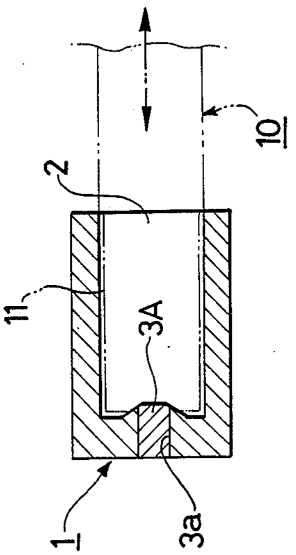
FIG. 2 is a sectional view of the coder taken on line A—A of FIG. 1.

In FIG. 1, reference numeral 1 denotes a coder arranged at every check position of a patrol course. The coder 1 is formed in a front surface thereof with an insert hole 2 and indicated on an upper surface thereof with a position code number IT (No. 8 in the figure) in order of positions. Designations 3a through 3n denote mounting portions each for mounting a detection element (magnetic substance) laterally formed in an inner wall of the insert hole side by side. Detachably attached within these mounting portions 3a through 3n are various kinds of detection elements 3A through 3N made of permanent magnets, such as, for example, a detection element for acknowledging that a patrol recorder is inserted into a predetermined position as will be described later, a detection element for designating an identification code of a patrol course such as, for example, user's code, inter-office block code, etc., a detection element for forming an identification code of the patrol course and a position code of the coder 1 arranged at every check position on the patrol course, and a detection element for effecting a parity check in order to prevent a code alteration or a code mispreparation (inferior code) at the code 1 side.

Likewise, in FIG. 1, reference numeral 10 denotes a patrol recorder according to the present invention, which is made compact in its overall size and is indicated at its front surface with a unit machine number 10. Reference numeral 11 denotes an insertion portion formed at a front end portion of the patrol recorder 10. The insertion portion 11 is insertable into the insert hole 2 of the coder 1 mentioned before. The respective sectional configurations of the insertion portion 11 and the insert hole 2 are contemplated as such that the insertion of the patrol recorder will not become reversely with respect to the front and rear surfaces thereof. A front end face of the insertion portion 11 insertable into the insert hole 2 as mentioned before is formed in a concave shape in section. Both right and left end portions within the concave front end face 11*a* is formed with an input side phototransistor 12 and an output side light emitting diode 13 constituting an input and output photo coupler for a central unit as will be described later. Disposed side by side between the phototransistor 12 and the light emitting diode 13 are various hole elements 14*a* through 14*n* for the use of, for example, a predetermined position detection, a code designation of a patrol course, an identification code, etc. in such a manner as to correspond to the detection elements 3A through 3N mounted on the respective mounting portions 3*a* through 3*n* of the coder 1.

Further, in the figure, reference numeral 15 denotes a display portion such as a liquid crystal display, etc. formed on the front surface portion of the patrol recorder 10. A standard indication 15A of the current month, date, time and minute is made on the display portion 15. When the patrol recorder 10 is inserted into the coder 1, the indication 15A is cleared and a read-out number (No. 8 in the figure) of the coder 1 is displayed on the display portion 15. When a call signal is received as will be described later, a message to the effect is displayed on the display portion 15. Reference numeral 16 denotes a sound producing portion in which a sound generator (for example, a buzzer) is started when it receives a clock signal showing a correct insertion of the patrol recorder 10 and the sound is stopped after being sounded for a predetermined time (for example, 3 seconds) when information such as a position code of the coder 1, the current month, date, time, minute has been written into a memory of the patrol recorder 10. In some cases, a lamp may be used together with the sound producing portion.

Reference numeral 17 denotes an NG lamp which blinks when an insertion mistake occurs, such as after a patrol record is effected by inserting the patrol recorder 10 into the coder 1, the same patrol recorder 10 as just mentioned is inserted into the same coder 1 again within a required time (for example, within one minute). The NG lamp 17 also blinks when the check code hole element detects a code mistake.

Reference 18 denotes a signal receipt acknowledging portion such as a buzzer or a lamp which is actuated when a receiver 18A provided within the patrol recorder 10 receives a call signal transmitted from a transmitter 50 (see FIG. 4) provided to the center, etc. Similarly, reference numeral 19 denotes a connecting terminal for charging a battery formed on a front end face 11a of the insertion portion 11. When the patrol recorder 10 is inserted into a central unit as will be described later, a battery 19B of the patrol recorder 10 is charged through the connecting terminal 19.

Since the transmitter 50 and the receiver 18A are commercially available, a detailed description of the constructions thereof will be omitted.

Figure 3:
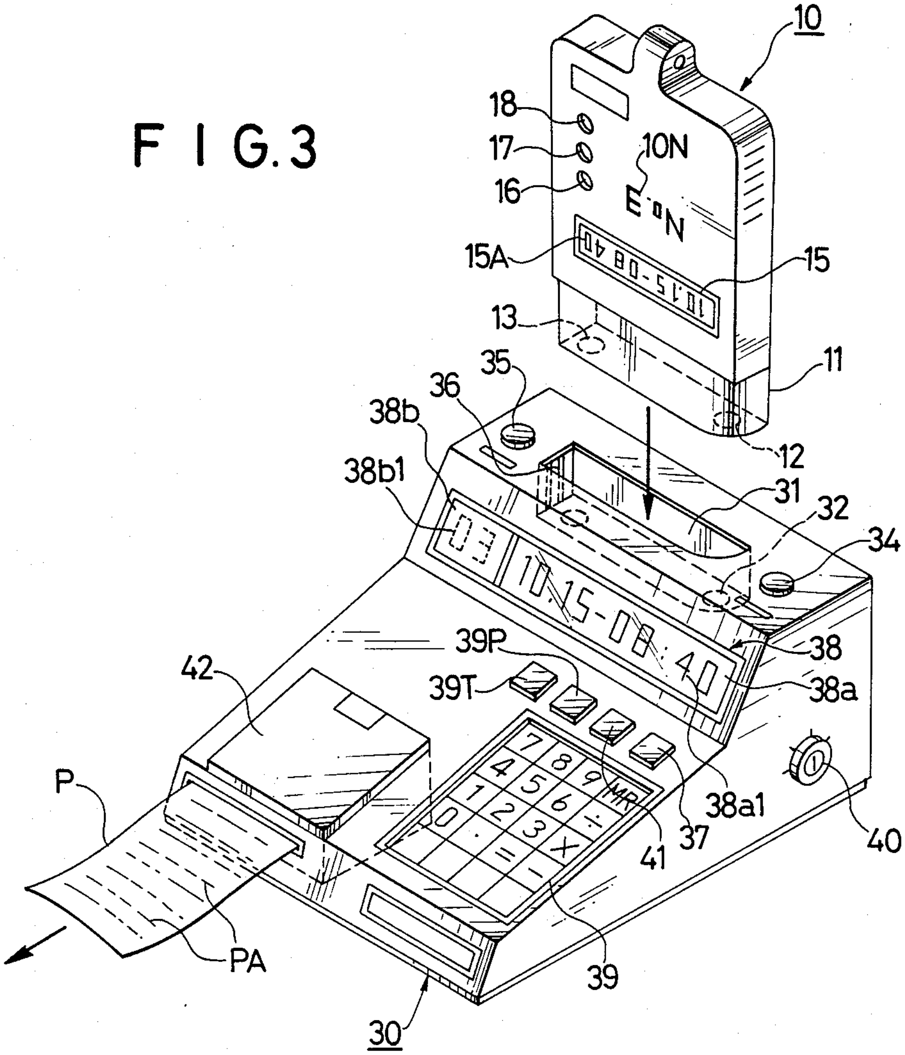
FIG. 3 is a perspective view of a patrol recorder and a central unit according to one embodiment of the present invention.

In FIG. 3, reference numeral 30 generally denotes a central unit. Similarly, reference numeral 31 denotes a insertion hole permitting the front end insertion portion 11 of the patrol recorder 10 formed in the upper surface of the unit 30 to be inserted therein. Reference numerals 32 and 33 denote an output side light emitting diode and an input side phototransistor provided on both ends of the internal bottom surface of the insertion hole 31 adjacent to the phototransistor 12 and the light emitting diode 13 of the patrol recorder 10 inserted. Various kinds of output signals transmitted to the patrol recorder 10 side from the central unit 30 side are fed to a CPU of the patrol recorder 10 through the light emitting diode 32 and the phototransistor 12 disposed adjacent thereto, while various kinds of output signals transmitted to the central unit 30 side from the patrol recorder 10 are fed to the central unit 30 side through the light emitting diode 13 and the phototransistor 33 disposed adjacent thereto.

Similarly, reference numerals 34 and 35 denote a terminal connecting lamp and a charge indicating lamp provided on an upper surface portion of the central unit 30. Reference numeral 36 denotes a connecting terminal, 37 denotes a charging switch and 38 denotes a display portion such as a liquid crystal display formed on a front surface portion of the central unit 30. The display portion 38 comprises a time display portion 38*a* for displaying 38*a*1 current month, date, time, minute, and a unit display portion 38*b* for displaying 38*b*1 the unit machine number 10N of the patrol recorder 10 inserted. Similarly, reference 39 denotes a ten key input apparatus provided on the central unit 30. Various programs to be stored in a memory (not shown) of the central unit 30 are written by the use of this ten key input apparatus 39.

That is, a predetermined area of RAM of the central unit 30 stores information such as, for example, patrol start time, unit machine number of the patrol recorder 10 to be carried on the patrol, order of the coder 1 constituted separately for the respective patrol courses, i.e., arrangement of coder numbers, respective position spaces, i.e., allowable time (minute) between coders 1 . . . , etc. Likewise, in ROM, there are stored, besides a system program for effecting a read-out and a print-out of patrol information, a program for automatically rectifying a clock portion 21 of the patrol recorder 10 based on a clock portion as will be described later, and a program for automatically checking respective systems of the patrol recorder 10.

Furthermore, the afore-mentioned ten key input apparatus 39 effects functions such as to write a patrol start time in the memory of the patrol recorder 10. Reference numeral 40 denotes a key switch for switching modes provided on the central unit 30. The key switch 40 is used in cases such as when the respective programs stored in the memory are to be changed, for a new program is to be established.

Figure 5:
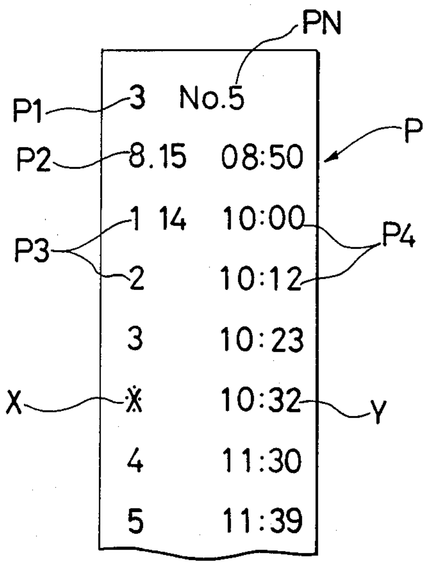
FIG. 5 is a front view showing one example of printed out information.

Reference numeral 41 denotes a clear key for erasing respective programs written in the memory of the central unit 30 through the key input apparatus 39. Similarly, reference numeral 42 denotes a printer for printing out patrol information stored in the memory 22 of the patrol recorder 10 on a roll of paper P. FIG. 5 illustrates one example of such printed out information.

The printer 42 prints the printing information as follows. A user's code number of a patrol course or interoffice block number PN, a unit machine number P1 of the patrol recorder 10, and month, time, minute P2 at the time when the information is printed out are printed out first. Then, a position code P3 and a patrol time P4 of the coder 1 disposed to a first check position are laterally relatedly printed out in one row. Then, the position code P3 and the patrol time P4 of a second ad thereafter coders 1 are printed out the following row and then rows thereunder in sequence.

During printing, when the patrol recorder 10 receives a call signal while patrolling, a mark X for acknowledging the receipt of this together with a receiving time Y are printed out.

Figure 4:
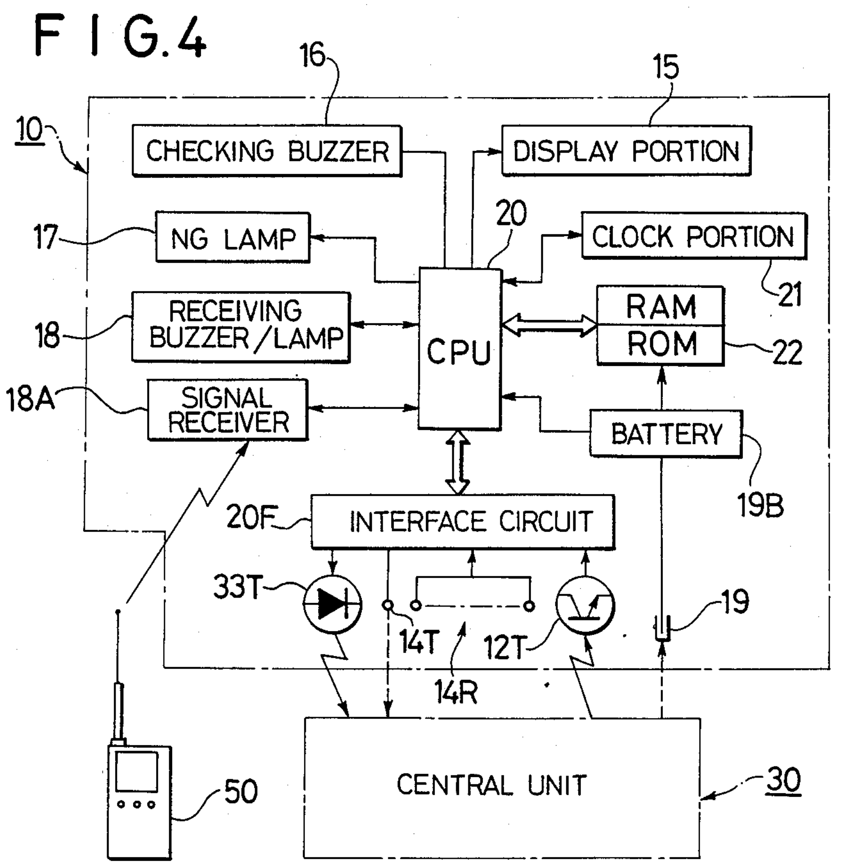
FIG. 4 is a block diagram showing the electrical constitution of the patrol recorder.

FIG. 4 illustrates block diagram showing an electrical constitution of the patrol recorder 10. A control portion CPU 20 of the patrol recorder 10 is connected to an interface circuit 20F connected to an input portion 12T and an output portion 13L formed of the phototransistor 12T and the light emitting diode 33T, a unit home position detecting portion 14T formed of hole elements **14*a* through 14*n* and an identification code of the patrol course, position codes of the reader 1 and respective parity-check reading portions 14R, a display portion 15, a sound producing portion 16, an NG lamp 17, a signal receipt acknowledging portion 18 and a receiver 18A, a battery 19B, a clock portion 21 serving as a reference clock of the patrol recorder 10, and a memory portion 22 comprising a ROM for storing a system program of the patrol recorder 10** and a RAM for storing patrol information in sequence.

The function of the afore-mentioned call device-attached patrol recorder according to the present invention will be described next.

The patrol recorder 10 is inserted into the coders 1 . . . placed at every checking position of the patrol course in order. By this procedure, various kinds of patrol information are stored in the RAM of the memory portion 22 each time. After the patrol is completed, when the patrol recorder 10 is inserted into the central unit 30, the patrol information stored in the RAM is printed out in order on the roll of paper by the printer 42.

When a necessity of communication with a patrol guard on his patrol arises, a call signal may be transmitted by using the transmitter 50 provided to the center, etc. The transmitter 50 and the receiver 18A of the patrol recorder 10 are set in an identical frequency beforehand. Accordingly, the center side is capable of transmitting a call signal to a predetermined patrol recorder 10 (patrol guard) only. By setting the frequency in such a manner as to fit a receiver 18A of other patrol recorder 10, it is possible to transmit a call signal to a plurality of patrol recorders 10 using only one transmitter 50.

When the receiver 18A receives the call signal, it transmits a receipt signal to the CPU 20. Then, the CPU 20 actuates the signal receipt acknowledging portion 18 according to a program to inform a patrol guard through a buzzer or a lamp. At the same time, the CPU 20 causes the display portion 15 to display a message to the effect that it received a call signal. In addition, the fact that the call signal was received and the time when it was received are stored in the RAM of the memory portion 22. And, data regarding these call signal receipts are printed out X and Y on the roll of paper P together with other patrol data as shown in FIG. 5 by the central unit 30 after the patrol is completed.

In this way, when the patrol guard receives a call signal on his patrol, he may communicate with the center, etc. through a telephone, an automobile wireless device or the like. By this, the patrol guard is capable of communicating with the center, etc.

As described in the foregoing, according to a call device-attached patrol recorder of the present invention, the patrol recorder itself includes a call device similar to a pocket bell pager or beeper. Accordingly, a patrol guard is not bothered with carrying both a pocket bell and a patrol recorder on his patrol. Instead, he can simply go on patrol carrying only the patrol recorder. In addition, he is no longer bothered with the fact that no communication can be made due to his failure to carry pocket bell. Moreover, the patrol recorder used in the present invention is electronically constituted (microcomputer) so that the patrol information is stored and the information is printed out after the patrol is completed. Accordingly, it is possible to store the information of the call together with the patrol information and print them out for record. As seen, this is, indeed, an epoch making patrol recorder.

From the foregoing it will be seen that a novel and efficient patrol recorder attached with a call device has been described herein. The descriptive and illustrative materials employed herein are utilized for purposes of exemplifying the present invention and not in limitation thereof. Accordingly, numerous modifications of the present invention will occur to those skilled in the art without departing from the spirit and scope of the present invention. Moreover, it is to be understood that certain features of the present invention can be used to advantage without a corresponding use of other features of the present invention.

What is claimed is:

1. A call device-attached patrol recorder system comprising:

- a plurality of coders, each having a unique position code, said coders arranged along check positions of a patrol course such that said position codes respectively correspond to said check positions;
- at least one movable patrol recorder including a means for storing patrol information, wherein said patrol information includes a position code and a patrol time of one of said plurality of coders, said position code and patrol time being stored by inserting said patrol recorder into said one of said plurality of coders;
- a fixed central unit including a means for reading out and printing out said patrol information recorded in said at least one patrol recorder on paper;
- said at least one patrol recorder also including a call signal receiving means for receiving a call signal emitted from a transmitter means disposed by said central unit and a call signal acknowledging means for acknowledging the receipt of said call signal.

2. A call device-attached patrol recorder system as recited in claim 1, wherein said call signal receiving means includes a radio signal receiver provided within said at least one patrol recorder.

3. A call device-attached patrol recorder system as recited in claim 1, wherein said call signal acknowledging means includes a buzzer or a lamp.

* * * * *